(12) United States Patent
Jensen

(10) Patent No.: US 10,180,195 B2
(45) Date of Patent: Jan. 15, 2019

(54) SOLENOID VALVE WITH PROGRESSIVE SPRING INSIDE ANCHOR

(71) Applicant: DANFOSS A/S, Nordborg (DK)

(72) Inventor: Leo Finn Jensen, Middelfart (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 14/900,652

(22) PCT Filed: Jun. 26, 2014

(86) PCT No.: PCT/IB2014/062609
§ 371 (c)(1),
(2) Date: Dec. 22, 2015

(87) PCT Pub. No.: WO2014/207684
PCT Pub. Date: Dec. 31, 2014

(65) Prior Publication Data
US 2016/0146368 A1 May 26, 2016

(30) Foreign Application Priority Data
Jun. 26, 2013 (EP) .................................. 13173862

(51) Int. Cl.
*F16K 31/06* (2006.01)
*F16K 31/40* (2006.01)
*F16F 1/04* (2006.01)

(52) U.S. Cl.
CPC .......... *F16K 31/0655* (2013.01); *F16F 1/047* (2013.01); *F16K 31/404* (2013.01)

(58) Field of Classification Search
CPC .... F16K 31/0655; F16K 31/404; F16K 31/40; F16K 31/402; F16F 1/047; H01F 3/00
(Continued)

(56) References Cited

U.S. PATENT DOCUMENTS

| | | | |
|---|---|---|---|
| 1,815,612 A * | 7/1931 | Cataline | F01L 1/462 251/337 |
| 3,926,405 A | 12/1975 | Arnold | |

(Continued)

FOREIGN PATENT DOCUMENTS

| | | |
|---|---|---|
| DE | 199 48 446 A1 | 4/2001 |
| WO | 2009/000271 A1 | 12/2008 |
| WO | 2012/117839 A1 | 9/2012 |

OTHER PUBLICATIONS

Communication pursuant to Article 94(3) EPC for European Application No. 13173862.7 dated Aug. 25, 2016.
(Continued)

*Primary Examiner* — John Bastianelli
(74) *Attorney, Agent, or Firm* — McCormick, Paulding & Huber LLP

(57) ABSTRACT

A solenoid valve includes a housing, having an inlet and an outlet, wherein the solenoid valve also includes a valve element and a valve seat. To provide a solenoid valve to be used with high maximum operating pressure differences between inlet and outlet, the solenoid valve includes at least one progressive spring, wherein the valve element is forced by the at least one progressive spring. Thereby, the spring force acting on the valve element in the closed position of the valve may be decreased, while still retaining a large spring force in the opened position of the solenoid valve.

20 Claims, 6 Drawing Sheets

(58) Field of Classification Search
USPC .............. 251/30.01–30.05, 77, 129.15, 337
See application file for complete search history.

(56) References Cited

U.S. PATENT DOCUMENTS

| | | | | |
|---|---|---|---|---|
| 5,294,089 | A * | 3/1994 | LaMarca | F16K 31/42 251/30.02 |
| 5,533,873 | A | 7/1996 | Kindl | |
| 5,565,832 | A * | 10/1996 | Haller | H01F 7/088 335/279 |
| 5,992,822 | A * | 11/1999 | Nakao | F16K 31/0655 251/129.15 |
| 6,076,550 | A | 6/2000 | Hiraishi et al. | |
| 6,273,396 | B1 * | 8/2001 | Kato | F16K 31/0655 251/337 |
| 6,293,513 | B1 | 9/2001 | Birkelund | |
| 6,619,612 | B2 * | 9/2003 | Freisinger | F16K 31/404 251/30.03 |
| 6,737,766 | B1 | 5/2004 | Burrola et al. | |
| 6,759,934 | B2 * | 7/2004 | Bircann | H01F 7/081 251/129.15 |
| 6,837,478 | B1 * | 1/2005 | Goossens | B60T 8/363 251/129.15 |
| 6,877,717 | B2 * | 4/2005 | Collins | B60T 8/363 335/279 |
| 7,275,732 | B2 * | 10/2007 | Kato | F16K 31/0655 251/129.15 |
| 7,828,265 | B2 | 11/2010 | Sisk et al. | |
| 2010/0252757 | A1 * | 10/2010 | Birkelund | F16K 31/0655 335/281 |
| 2012/0223261 | A1 | 9/2012 | Kupratis | |

OTHER PUBLICATIONS

International Search Report for PCT Serial No. PCT/IB2014/062609 dated Aug. 27, 2014.
European Search Report for European Application No. EP13173862.7 dated May 25, 2016.

* cited by examiner

US 10,180,195 B2

SOLENOID VALVE WITH PROGRESSIVE SPRING INSIDE ANCHOR

CROSS-REFERENCE TO RELATED APPLICATIONS

This application is entitled to the benefit of and incorporates by reference subject matter disclosed in the International Patent Application No. PCT/IB2014/062609 filed on Jun. 26, 2014 and European Patent Application No. 13173862 filed on Jun. 26, 2013.

TECHNICAL FIELD

The invention relates to a solenoid valve comprising a housing having an inlet and an outlet, wherein the solenoid valve further comprises a valve element and a valve seat.

BACKGROUND

Solenoid valves are a known type of electronically activated valves. Solenoid valves are often used to control the flow of liquids or gases, replacing manual valves where a remote control of the valve is desirable. A solenoid valve is operated by providing a coil with electrical current, whereby a valve member is displaced inside the housing to open or close an orifice, whereby a flow through the valve is permitted or prevented. The orifice is commonly opened or closed by displacing a valve element from a valve seat or displacing the valve element onto the valve seat.

In case of a normally closed valve, the valve element is usually maintained against the valve seat by a return spring, preventing flow through the solenoid valve as long as electric current is not provided to the solenoid valve.

For directly operated solenoid valves, the main orifice is the only flow path through the valve. Such directly operated solenoid valves are used in systems where either low flow capacities are sufficient or if the maximum operating pressure differential between the inlet and the outlet pressures of the valve are comparatively low. In case the pressure differential between the inlet and the outlet becomes too large, directly operated solenoid valves cannot be operated reliably anymore. In particular, the pressure acting on the valve member or the valve element may become too large to allow a controlled opening or closing of the solenoid valve, resulting in the valve element either not being displaceable or displacement of the valve element requiring much force and possibly resulting in damage to the valve.

Problems mentioned above are less severe with piloted solenoid valves, wherein the solenoid valve allows or prevents fluid connections between different chambers of the valve. Thereby, the main flow connection between inlet and outlet is only opened, if a minimum operating pressure differential between the inlet and the outlet is present, even if the solenoid valve is open.

A solenoid valve as mentioned above is known from U.S. Pat. No. 7,828,265 B2. The solenoid valve is normally closed and the valve element may be displaced away from the valve seat by providing a coil with electric current. The valve element is received within a bore of a slideable valve member. The valve element is forced towards the valve seat by two coaxial springs. The coaxial springs are received in different sections of the bore of the valve member to ensure a controlled displacement of the valve member in relation to the valve element. If the coil is provided with electrical current, the valve member is displaced away from the valve seat and engages the valve element to displace the valve element from the valve seat in a controlled manner. A forceful impact of the valve member on the valve element is prevented by the use of the two coaxial springs. The solenoid valve may be used at a higher maximum operating pressure differential than previous solenoid valves.

The solenoid valve shown in U.S. Pat. No. 7,828,265 B2 has the disadvantage of a complicated construction of the solenoid valve, in particular two different types of springs must be positioned coaxially in bores of the valve member having different diameters. An adjustment of the spring properties requires changing the length and/or diameter of the bores.

An additional problem of the solenoid valve shown in U.S. Pat. No. 7,828,265 is that if an electrical current to the coil is not provided, some residual magnetization of the valve member may remain, which may counteract the spring forces trying to force the valve member towards the closing position. Same problem may be caused by adhesion forces between the valve member and the anchor core, against which the valve member abuts in the open position of the valve. Also the adhesion forces must be overcome for displacing the valve member towards the closing position. Both problems may become more severe with the number of duty cycles that the valve has performed.

A further solenoid operated proportional valve is known from U.S. Pat. No. 3,926,405. This valve has a valve element pressed against a valve seat by means of a coil spring. The valve element can be lifted off from the valve seat by means of an auxiliary element which comes into contact with a progressive spring after a certain distance of movement in opening direction.

US 2012/0223261 A1 shows a switching valve having a valve element moveable in a housing. The valve element is loaded in closing direction by a series connection of two springs. The two springs are separated by means of an adapter piece. After a first part of a stroke of the valve element in opening direction the adapter piece comes to contact with a stop in the housing of the valve. The following movement of the valve element takes place against the force of a single spring only. Assembly of such a valve is rather complicated.

U.S. Pat. No. 6,076,550 shows a solenoid and a solenoid valve which is pilot controlled. A valve element is connected to a plunger, said plunger being moveable against the force of a spring within a coil of a solenoid. The attracting force in opening direction is increased by means of a permanent magnet.

DE 199 48 446 A1 shows a progressive spring for a suction valve, in particular for pumps of a controlled breaking system.

SUMMARY

A task of the invention is to provide a solenoid valve that may be operated at higher maximum operating pressure differentials, while still allowing a simple assembly of the valve. At the same time the solenoid valve should provide a large spring force in the open position of the valve to overcome adhesion forces and forces from residual magnetization.

According to the invention, the above mentioned task is solved in that the solenoid valve comprises at least one one-piece progressive spring guided in a cylindrical bore, wherein the valve element is loaded by the at least one progressive spring in closing direction, wherein the progressive spring comprises at least two spring sections, wherein at least two of the spring sections have a different pitch and the spring section with the lower pitch is fully compressed in the open position of the solenoid valve.

By using a progressive spring, several springs in individual bores are not needed. A progressive spring may be guided within a cylindrical bore of the solenoid valve, whereby the assembly is simplified. The same effect that the solenoid valve can be used at higher maximum operating pressure differentials is still obtainable, because the spring force of the progressive spring is low upon opening the solenoid valve and is increasing when the valve member has been displaced to the completely open position and the progressive spring is compressed by a large distance. The force of the spring forcing the valve element and the valve member towards the closed position, when the coil of the solenoid is not provided with electrical current, can still be so large as to allow to close the valve, also at large fluid pressures. At the same time the progressive spring provides a spring force in the open position of the solenoid valve to overcome adhesion forces and forces by residual magnetization.

The distance between individual windings of the spring sections is different in at least two of the spring sections. Adjustment of the amount of compression necessary to fully compress the spring section with the lower pitch is easy. When the spring section with the lower pitch is fully compressed the spring constant of the progressive spring is increased, because only the remaining spring section with a larger pitch may still be compressed. Preferably, the progressive spring comprises, on at least one end, a spring section with always compressed windings. A spring section with always compressed windings results in the progressive spring being stabilized and exerting force more evenly on the part of the solenoid valve against which the progressive spring abuts, an anchor core and/or the valve member. Alternatively, the progressive spring may have only one spring section with a variable pitch along at least a part of the progressive spring.

The force of the progressive spring acting on the valve element is low in the closed position of the solenoid valve, while still retaining a large force of the progressive spring on the valve element in the open position of the solenoid valve. The progressive spring can still displace the valve element towards the closed position, even against large adhesion forces and/or forces by residual magnetization. At the same time, the force of the progressive spring pushing the valve element onto the valve seat in the closed position will not be large.

In another preferred embodiment, the solenoid valve is a normally closed valve, wherein the valve element sealingly abuts the valve seat, when the coil of the solenoid valve is not provided with an electrical current. The solenoid valve is normally closed with the progressive spring forcing the valve element towards the valve seat when the coil of the solenoid valve is not provided with electrical current.

In a further preferred embodiment, the solenoid valve comprises a substantially cylindrical valve member received slideably within the solenoid valve. Substantially cylindrical means, that the radial outer circumference of the valve member has the same cross-section, preferably circular, over most of the length of the valve member. The valve member is preferably magnetizable and may be displaced by providing electrical current to a coil of the solenoid valve to allow opening of the valve. The valve member interacts with the valve element to lift the valve element from the valve seat towards an opening direction.

In another preferred embodiment, the progressive spring is guided in a cylindrical bore in the valve member. Assembly of the solenoid valve is simple. Furthermore, different progressive springs can be chosen without having to change the dimension of the bore. Cylindrical bore means that the bore has the same cross-section, preferably a circle with a constant diameter, over most of length of the bore. Furthermore, the valve element may be received inside the valve member. The valve member interacts with the valve element during opening or closing the solenoid valve.

In another preferred embodiment, the solenoid valve comprises an aperture, wherein the valve element is slidably received in the aperture. The aperture is preferably inside the valve member at an end of the valve member towards the valve seat. Furthermore, a washer may be in the aperture abutting the valve element. The washer may maintain pressure on the valve element to prevent the valve element from tilting. Tilting of the valve element may be a problem, if the valve element has a low height. For example, the washer may be forced towards the valve element by a support spring. Using a washer also allows a wider range of elastic materials for the valve element without the valve element being damaged by the interaction with the progressive spring. For example, the valve element may consist of polytetrafluorethylene.

In a further preferred embodiment, a protrusion extends from an inner circumference of the aperture, and the protrusion comprises an annular ledge at the end of the aperture towards the valve seat, and wherein the annular ledge provides a stop for the valve element. Preferably, the protrusion results in a smaller opening of the aperture than the maximum radial extension of the valve element to prevent the valve element from exiting the valve member at the end of the valve member towards the valve seat. The protrusion provides a stop for the valve element for maintaining the valve element inside the valve member when the valve element is displaced in a direction away from the valve seat. Furthermore, the protrusion allows the valve member to engage the valve element when opening the solenoid valve. The valve element preferably comprises an annular shoulder that substantially matches the shape of the annular ledge of the valve member.

Preferably, the valve member is first displaced in a direction away from the valve seat by a stroke height, when the coil of the solenoid valve is provided with electrical current. The valve member may first be displaced a first stroke distance and gain momentum when the coil of the solenoid valve is provided with electrical current, before the opening of the valve starts. A first stroke distance may be obtained by displacing the valve member an additional distance compared to displacement of the valve element after the valve element has already engaged the valve seat. Preferably, the stroke distance is longer than 3 mm.

Preferably, the valve member engages the valve element and lifts the valve element from the valve seat, when the valve element has been displaced the first stroke distance. The valve member already has gained momentum by being accelerated through the magnetic field over the first stroke distance. Because the progressive spring has a lower spring constant at the point of opening, the valve member is not exerting a large force on the valve element when displacing the valve element from the valve seat against the force of the progressive spring.

In another preferred embodiment, the solenoid valve comprises an anchor core. The progressive spring is abutting the anchor core. The progressive spring preferably abuts the anchor core with a spring section comprising always compressed windings. The individual windings of the spring in the spring section comprising always compressed windings abut against the neighboring windings. The spring is stabilized, especially in the open position of the solenoid valve. The anchor core may furthermore be connected to a substantially cylindrical casing. The casing may also enclose the valve member and the progressive spring and the valve element. The casing may in be part of the housing or be connected to the housing. The anchor core and the casing may be part of an anchor of the solenoid valve.

In another preferred embodiment, an additional end bore is provided at the end of the valve member away from the valve seat, and wherein the additional end bore has a larger cross-sectional area than the cylindrical bore. An additional end bore simplifies insertion of different parts of the solenoid valve, for example, the progressive spring. Furthermore, the additional end bore allows controlled resting of the valve element against an anchor core.

In another preferred embodiment, the anchor core comprises an anchor protrusion abutting the additional end bore when the valve element is displaced away from the valve seat. The anchor protrusion and the additional end bore may interact to define a controlled resting position of the valve member in the opened position of the solenoid valve. Furthermore, the anchor protrusion and the additional end bore may prevent the progressive spring from being compressed too much. The progressive spring being compressed too much may result in a large force of the progressive spring acting on the valve element when the coil of the solenoid valve is not provided with electrical current.

Possibly, the valve seat is next to an orifice having an orifice inlet and an orifice outlet, and the orifice has a diffuser characteristic in a direction from the orifice inlet towards the orifice outlet. An orifice having a diffuser characteristic in a direction from the orifice inlet towards the orifice outlet may preferably be in an orifice member together with the valve seat. Alternatively, the orifice may be an integral part of the membrane, and the orifice member is not needed. An orifice with a diffuser characteristic reduces the pressure at the outlet of the solenoid valve, thereby increasing the maximum operating pressure difference of the solenoid valve. An orifice with a diffuser characteristic may for example be achieved if the orifice comprises a conical orifice section, wherein the cross-sectional area of the orifice inlet is smaller than the cross-sectional area of the orifice outlet.

In a preferred embodiment, the cross-sectional area of the orifice inlet is smaller than the cross-sectional area of the orifice outlet. The cross-sectional area of the orifice inlet being smaller than the cross-sectional area of the orifice outlet results in the orifice having a diffuser characteristic. The pressure at the orifice inlet remains higher than the pressure at the orifice outlet.

In a further preferred embodiment, the orifice comprises at least one conical orifice section. The orifice comprising at least one conical orifice section results in the orifice having a diffuser characteristic in a flow direction from an orifice inlet to an orifice outlet. At the same time a high fluid flow through the orifice is obtained by increasing the flow speed as compared to an orifice with a substantially cylindrical shape. The conical orifice section preferably extends over the most of the length of the orifice. Preferably, walls of the conical orifice section are inclined relative to a central axis of the orifice by an angle of less than 10°.

In another preferred embodiment, the orifice comprises at least one cylindrical orifice section. The orifice comprising at least one cylindrical orifice section stabilizes the fluid flow and results in the flow speed through the orifice is not reduced much. The diffuser characteristic of the orifice will mostly be provided by the remaining sections of the orifice.

In yet another preferred embodiment, the orifice is in an orifice member. Arranging the orifice in an orifice member allows connecting the orifice to the membrane and gives the possibility to choose any shaping for the orifice to achieve the intended diffuser characteristic. Furthermore, the orifice may displace together with the membrane.

In a preferred embodiment, the orifice is an integral part of the membrane. Arranging the orifice inside the membrane as an integral part of the membrane allows not providing an orifice member. Arranging the orifice inside the membrane as an integral part of the membrane may limit the possible choices for the membrane so that the orifice may still be provided with the shape to achieve the intended diffuser characteristic.

In yet another preferred embodiment, the orifice member is connected to the membrane. Connecting the orifice member to the membrane results in the orifice member moving together with the membrane when opening or closing the valve.

In a further preferred embodiment the membrane is plane. The membrane will be more flexible than, for example, a membrane supported by weaves. To obtain a controlled displacement of the membrane a support structure for the membrane may be provided.

In another preferred embodiment, the membrane is connected to a support structure. A flexible membrane can be used and the support structure still results in a controlled displacement of the membrane and the orifice. Furthermore, the surface of the membrane exposed to the pressures in the different chambers of the solenoid valve may be adjusted, as example, an inlet chamber, an outlet chamber and a servo chamber.

Preferably, the support structure comprises at least one support member connected to the orifice member. A support structure comprising at least one support member connected to the orifice member results in the orifice member displacing together with the membrane and the membrane securely connected to the orifice member.

In yet another preferred embodiment, the support structure comprises at least one support member having a plurality of openings. A support member comprising a plurality of openings may preferably be next to an inlet chamber of the solenoid valve. A large area of the membrane is exposed to the high pressure from the inlet side. The support member may also be used to attach the membrane to the housing, for example, at a radial outer end of the membrane.

The invention also relates to a vapor compression system comprising a solenoid valve according to any of the aforementioned embodiments.

BRIEF DESCRIPTION OF THE DRAWINGS

A preferred embodiment of the invention will in the following be described with reference to the figure, wherein:

FIGS. 1 and 2 show a first embodiment of the solenoid valve 1. The figures show cut views rotated by 90° relative to each other. The solenoid valve 1 comprises a housing 2 with two housing sections 3, 4.

DETAILED DESCRIPTION

Figure 1:
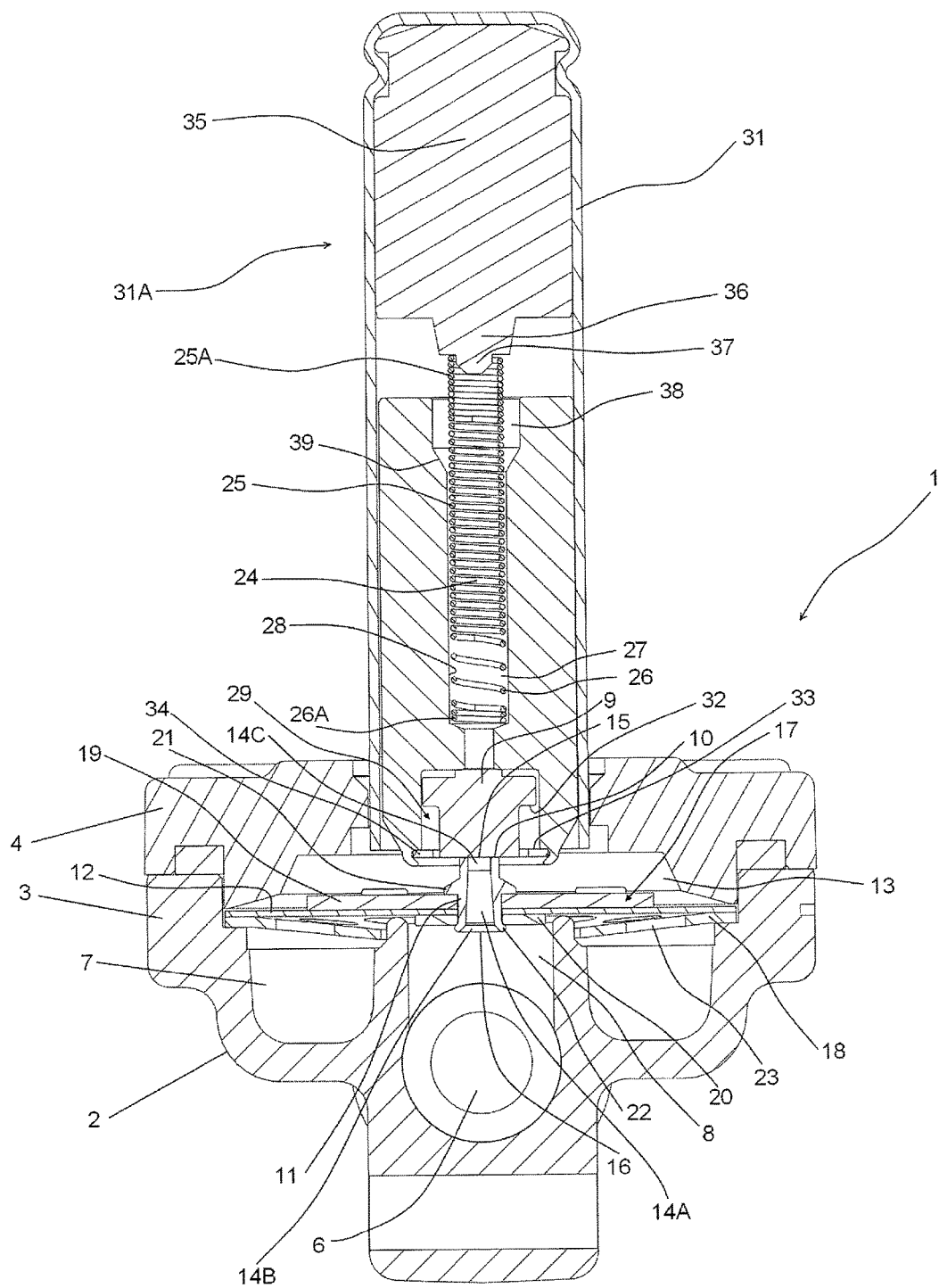
FIG. 1 shows a first cut view of a first embodiment of a solenoid valve according to the invention.

The solenoid valve 1 furthermore comprises an inlet 5 and an outlet 6. From the cut view according to FIG. 1 the inlet 5 is arranged at the backside of the solenoid valve 1 and is not visible. The magnetic coil of the solenoid valve is not shown for simplicity. In direct fluid connection to the inlet 5 an inlet chamber 7 is arranged. Similarly an outlet chamber 8 is located in direct fluid contact with the outlet 6.

The solenoid valve is shown in the closed position of the valve, and a valve element 9 sealingly abuts the valve seat 10. The valve element 9 is preferably made from polytetrafluorethylene and comprises at least two cylindrical sections. The valve seat 10 is part of an orifice member 11. The orifice member 11 is connected to a membrane 12 separating the inlet chamber 7 from a servo chamber 13.

Within the orifice member 11, an orifice 14 allows for a fluid connection between the outlet chamber 8 and the servo chamber 13 in the opened position of the solenoid valve 1.

Alternatively, an orifice member 11 may be omitted and the valve seat 10 and the orifice 14 provided as integral parts of the membrane 12. The membrane may be made from polytetrafluorethylene.

Figure 3:
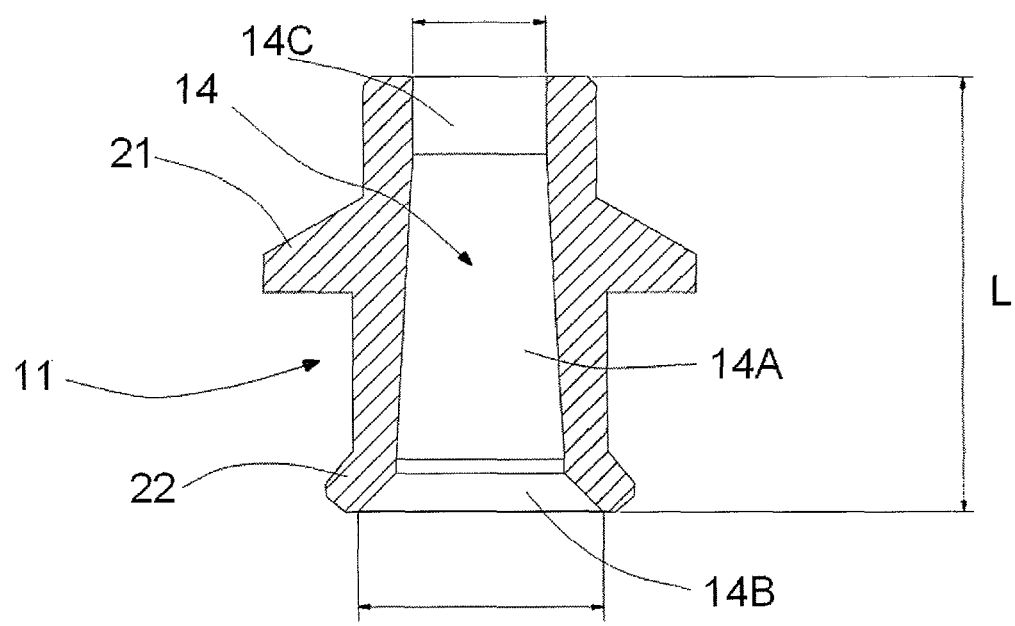
FIG. 3 shows a cut view of the orifice according to the first embodiment of the solenoid valve.

A detailed view of the orifice 14 is shown in FIG. 3. The orifice 14 comprises a conical orifice section 14A and has a diffuser characteristic in a flow direction from an orifice inlet 15 to an orifice outlet 16. The conical orifice section 14A preferably extends over most of the length L of the orifice. Preferably, the walls of the conical orifice section 14A are inclined relative to a central axis of the orifice 14 by an angle of less than 10°. The orifice 14 may also comprise a conical outlet section 14B. The orifice 14 may furthermore comprise a cylindrical orifice section 14C. In particular the orifice inlet 15 has a smaller cross-sectional area than the orifice outlet 16.

The conical orifice section 14A improves the diffuser characteristic and the fluid flow speed through the orifice 14. The orifice 14 has a comparable flow capacity to cylindrical orifices used in the state of the art, but increases the pressure drop over the orifice. The maximum operating pressure difference between the inlet pressure and the outlet pressure is increased. As mentioned before, the orifice 14 may also be an integral part of the membrane 12 with the same features as discussed for an orifice 14 in an orifice member 11.

Figure 2:
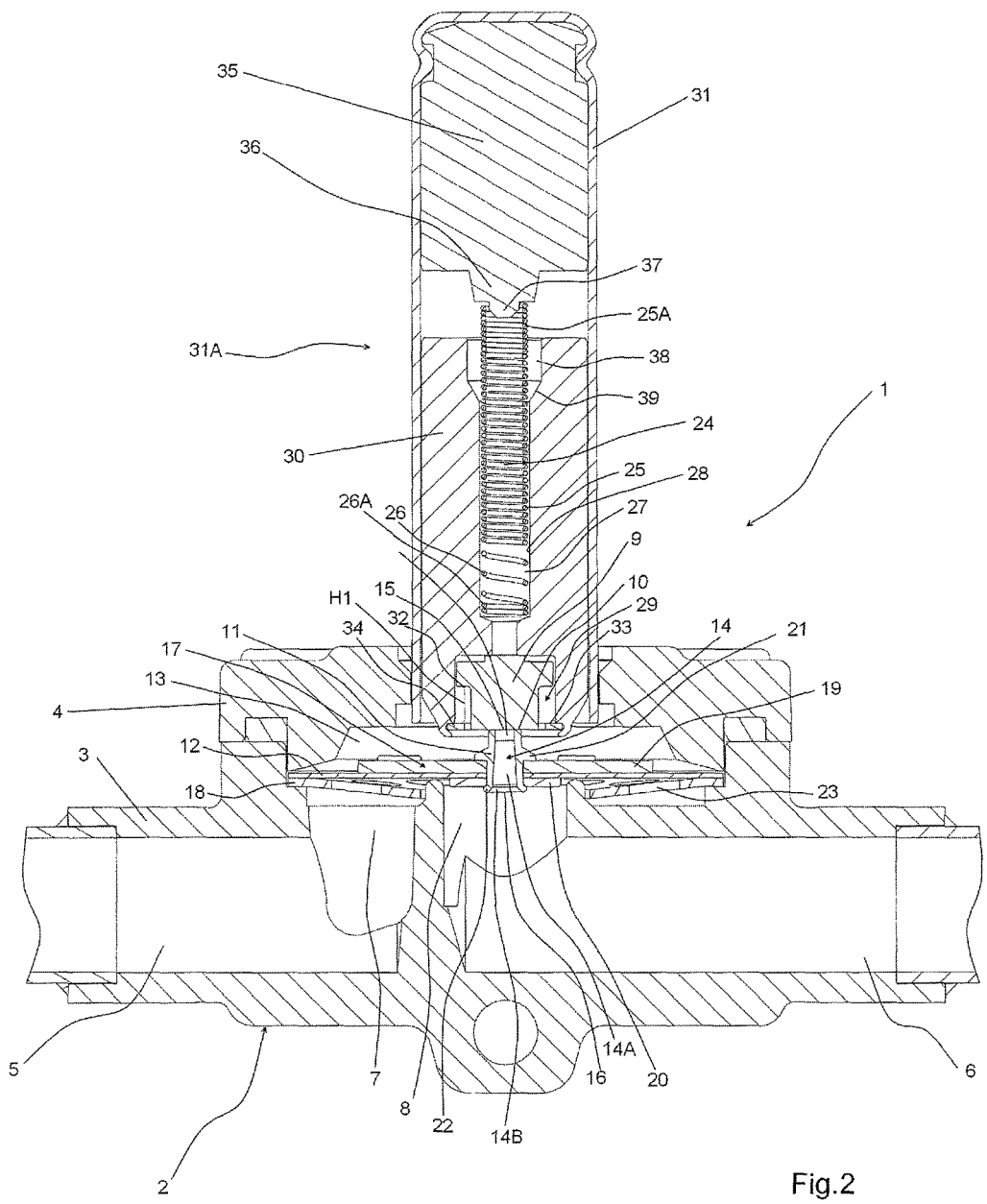
FIG. 2 shows a second cut view of the first embodiment of the solenoid valve.

Referring to FIGS. 1 and 2, the solenoid valve 1 here furthermore comprises a support structure 17 connected to the membrane 12. The support structure 17 comprises three support members 18, 19, 20. Two of the support members 19, 20 are substantially ring disc shaped and enclose the membrane 12 at least partially from the top side or the bottomside of the membrane 12. The second support member 19 is in fluid contact with the servo chamber 13 and is connected to the orifice member 11. The orifice member 11 to this end comprises a first annular flange 21 that rests against the second support member 19. The orifice member 11 furthermore comprises a second annular flange 22 whereby the orifice member is connected to the third support member 20. The cylindrical outlet section 14B may be formed together with the second annular flange 22.

The first support member 18 is connected to the membrane 12 at the radial outer end of the membrane 12. The first support member 18 thereby fixes the membrane 12 to the housing 2. The first support member 18 furthermore comprises a plurality of openings 23 that allow the fluid from the inlet pressure chamber 7 to reach the membrane 12 in order to exert a pressure on it.

In case the solenoid valve 1 is in the open position the membrane 12 may be lifted upwards (in the shown orientation of the valve) by the pressure difference between the inlet chamber 7 and the servo chamber 13. Thereby a direct fluid connection from the inlet chamber 7 to the outlet chamber 8 is established. The support structure 17 ensures a controlled displacement of the membrane 12.

Figure 4:
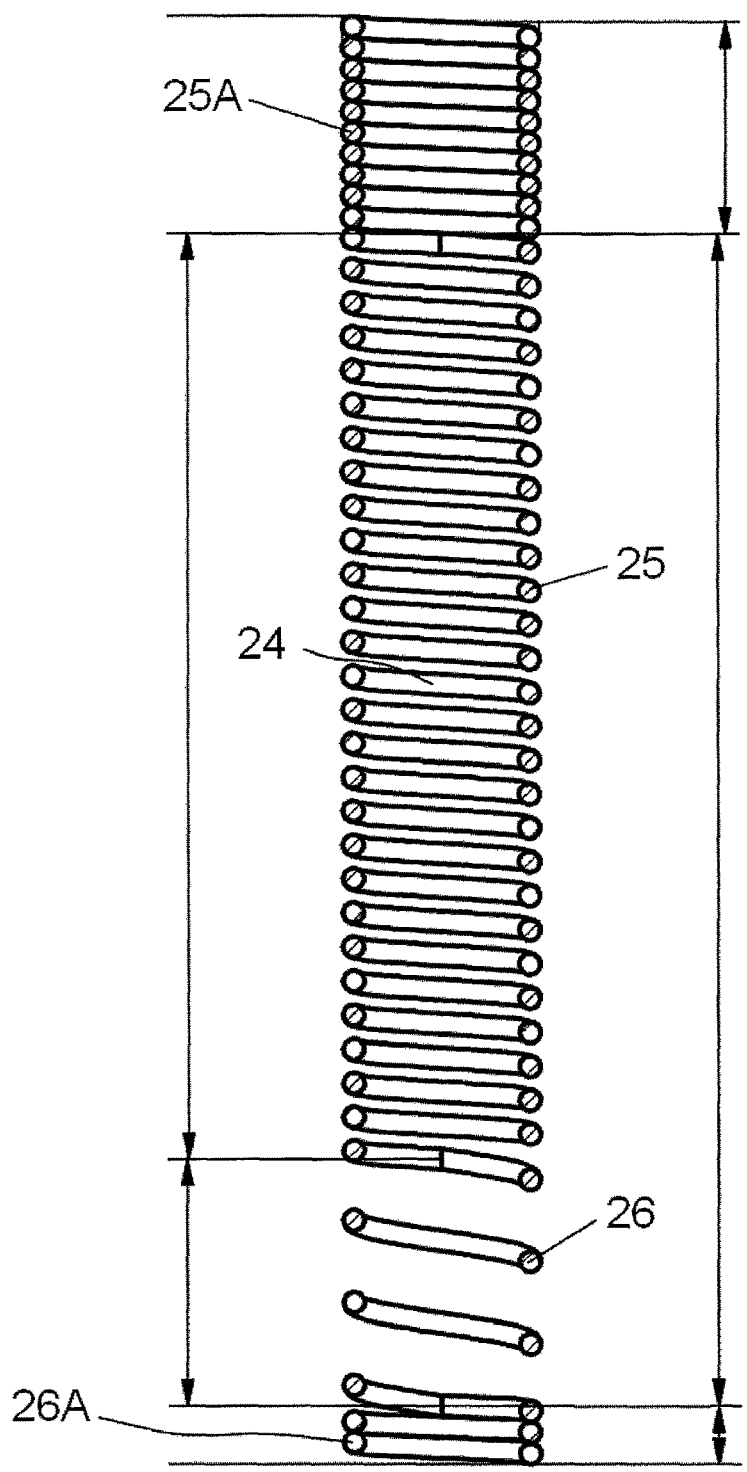
FIG. 4 shows a cut view of the progressive spring according to the invention.

The solenoid valve 1 furthermore comprises a progressive spring 24, which can also be seen in more detail in FIG. 4. The progressive spring 24 comprises four spring sections 25, 25A, 26 and 26A. On both ends of the progressive spring 24 spring sections 25A, 26A with compressed windings are arranged. These two spring section 25A, 26A are stiff and thus stabilize the progressive spring and ensure that the spring forces are applied more evenly. The progressive spring 24 also comprises two spring sections 25, 26 that are compressible and have a different pitch. The spring section 25 has a lower pitch than the spring section 26. Thereby, the spring constant of the progressive spring 24 will increase once the spring section 25 with a lower pitch has been fully compressed and only the spring section 26 with a larger pitch may still be compressed.

Referring to FIGS. 1 and 2, the progressive spring 24 is guided within a cylindrical bore 27 comprising straight sidewalls 28 along most of the length of the cylindrical bore 27. This way, the assembly of the solenoid valve 1 is simplified, because different kinds of progressive springs may be used with the same kind of cylindrical bore 27.

The valve element 9 is slidable within an aperture 29, which may be in fluid connection to the cylindrical bore 27. The valve member 9 comprises three cylindrical sections with different radii.

The solenoid valve 1 furthermore comprises a valve member 30 preferably being magnetizable and may be displaced by providing electrical current to a coil (not shown) radially outside the valve member 30. The valve member 30 is slideable within a casing 31. The casing 31 is connected to the housing 2. The casing 31 furthermore defines an anchor 31A of the solenoid valve 1, in which the valve element 9, the progressive spring 24 and the valve member 30 are positioned. The valve member 30 has a substantially cylindrical shape, the radially outer circumference of the valve member is circular over most of the length of the valve member 30.

The cylindrical bore 27 and the aperture 29 are located inside the valve member 30 along the cylindrical axis of the valve member 30. The valve element 9 and the progressive spring 24 are guided within the valve member 30.

FIGS. 1 and 2 show the solenoid valve 1 in the normal position of the valve element and the valve member. The normal position is the closed position. The valve element 9 sealingly abuts the valve seat 10, when the valve member 30 has been displaced by an additional stroke height H1 beyond the valve element 9 (see FIG. 2). The stroke height H1 is defined by the distance between an annular shoulder 32 of the valve element 9 and an annular ledge 33 of the valve member 30 in the closed position of the valve. The annular ledge 33 is part of a protrusion 34 located at the end of the aperture 29 towards the valve seat 10 in the open position of the solenoid valve 1. The protrusion 34 extends from an inner circumference of the aperture 29. The annular ledge 33 provides a stop for the valve element 9.

When the coil of the solenoid valve 1 is provided with electrical current, a magnetic field is provided displacing the valve member 30 in the direction away from the valve seat 10. The valve member 30 will initially be displaced independently from the valve element 9 until the valve member 30 has been displaced by the stroke height H1. Along the stroke height H1 the valve member 30 will be displaced by the magnetic field and gain momentum until the annular ledge 33 meets the annular shoulder 32 of the valve element 9 and lifts the valve element 9 from the valve seat 10. Because the valve member 30 has a long stroke height H1, the valve member can gain momentum to lift the valve element from the valve seat, even if the pressure difference between inlet 5 and outlet 6 is large. The maximum operating pressure difference of the solenoid valve 1 is increased. This is furthermore supported by the fact the progressive spring 24 may have a relatively low spring constant in the closed position of the solenoid valve 1.

The spring section 25 in the closed position of the solenoid valve 1 is not fully compressed and will only become stiff and fully compressed, after the valve element 9 has been lifted from the valve seat 10. When the spring section 25 with the lower pitch is fully compressed, the spring constant of the progressive spring 24 is larger than in the closed position of the solenoid valve 1. Forces preventing the valve member 30 from moving towards the closed position can be overcome more easily. Forces preventing the valve member 30 from moving towards the closed position may for example be forces resulting from a residual magnetization of the valve member 30 after the coil of the solenoid valve 1 is not provided with electrical current or adhesion forces holding the valve member 30 to the anchor 31A.

A relatively large spring force in the opened position of the solenoid valve 1 may be obtained, allowing to close the valve even at large operating pressure difference between the inlet 5 and the outlet 6. At the same time, the spring force of the progressive spring 24 will be low in the closed position of the solenoid valve 1.

At the end of the casing 31 away from the valve seat 10, an anchor core 35 is positioned. The anchor core 35 is substantially cylindrical and is connected to the casing 31. At the end of the anchor core 35 towards the valve seat 10, an anchor protrusion 36 is positioned. The progressive spring 24 is abutting the anchor core 35 at the anchor protrusion 36 via a bulge 37.

The cylindrical bore 27 comprises an additional end bore 38 positioned at the end of the valve member 30 away from the valve seat 10. In the opened position of the solenoid valve 1, the valve member 30 may rest against the anchor protrusion 36 of the anchor core 35 at the widening 38 of the valve member 30. The additional end bore 38 comprises a tilted section 39 that substantially matches the shape of the anchor protrusion 36.

Figure 5:
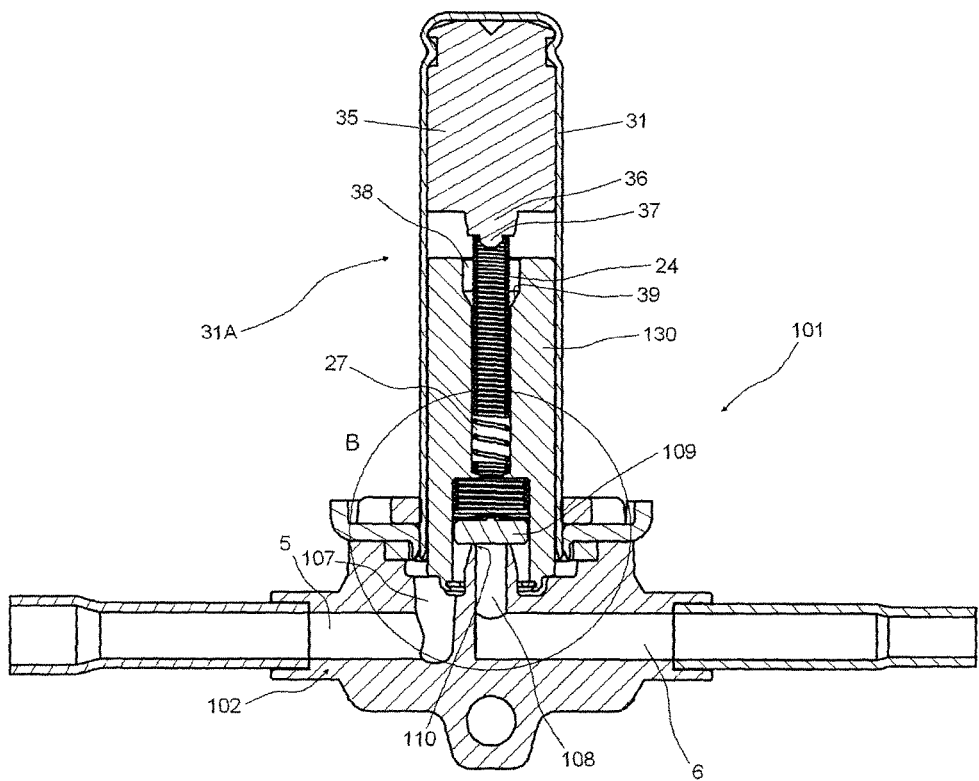
FIG. 5 shows a first cut view of a second embodiment of a solenoid valve according to the invention.
Figure 6:
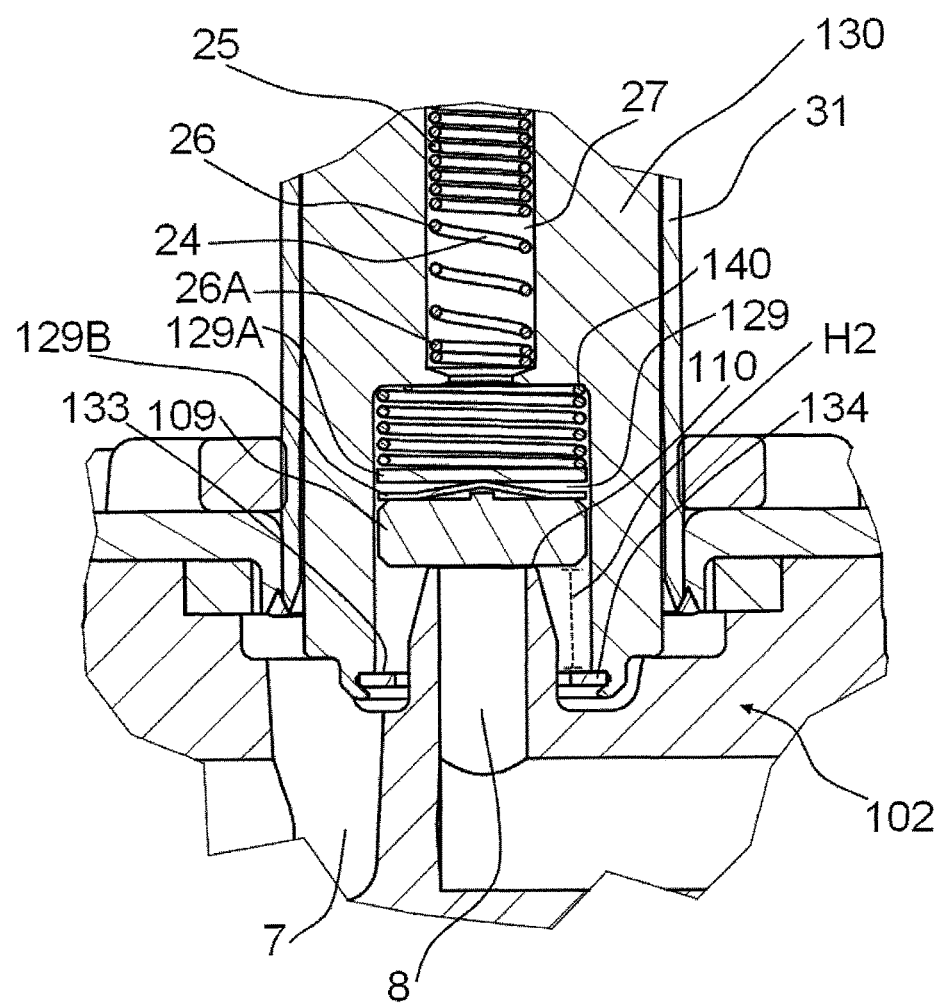
FIG. 6 shows an enlarged detail B of FIG. 5.

FIGS. 5 and 6 show a second embodiment of a solenoid valve 101 according to the invention. Corresponding elements to the first embodiment are numbered with the same reference signs. FIG. 6 shows an enlarged view of the section B of the solenoid valve 101 shown in FIG. 5.

The solenoid valve 101 comprises a housing 102 and an inlet 5 and an outlet 6. The magnetic coil of the solenoid valve 101 is not displayed for reasons of simplicity. The solenoid valve 101 is a directly operated solenoid valve. When the valve element 109 is displaced from the valve seat 110, a direct fluid connection between inlet 5 and outlet 6 is established.

As in the first embodiment, solenoid valve is shown in the closed position of the valve. A valve element 109 sealingly engages a valve seat 110. The valve element 109 has a substantially cylindrical shape and is provided in an aperture 129 of a valve member 130.

In this embodiment, the valve element 109 is forced by a support spring 140 received in the aperture 129. The height of the valve member 109 may be reduced as compared to the first embodiment, without the valve element 109 being tilted inside the aperture 129. To further stabilize the valve element 109, a washer 129A, and a push plate 129B are between the valve element 109 and the support spring 140. The washer 129A and the push plate 129B allow keeping the force of the support spring 140, and indirectly the force of the progressive spring 24, on the valve element 109 and ensure that the valve element 109 is displaced to the intended position of the valve element 109.

The valve seat 110 in this embodiment is part of the housing 102.

The solenoid valve 101 comprises a progressive spring 24, as discussed with reference to FIGS. 1, 2 and 3. The progressive spring 24 is guided in a cylindrical bore 27 and abuts against the valve member 130 on the end towards the valve seat 110.

The valve member 130 is preferably magnetizable and may be displaced by providing electrical current to a coil (not shown) provided radially outside the valve member 130. The valve member 130 is received slideably within the casing 31. The casing 31 is connected to the housing 102.

FIGS. 5 and 6 show the solenoid valve 101 in the normal position of the valve element 109, the closed position. The valve element 109 sealingly engages the valve seat 110, and the valve member 130 has been displaced by an additional stroke height H2 beyond the valve element 109 (see FIG. 6). The stroke height H2 is defined by the distance between the valve element 109 and an annular ledge 133 of the valve member 130 in the closed position of the valve.

Because the valve element 109 may have a lower height as compared to the first embodiment, the stroke height H2 may be larger than in the first embodiment. When the coil of the solenoid valve 101 is provided with electrical current, the valve member 130 can be displaced by the magnetic field over a larger distance. The valve member 130 may displace the valve element 109 from the valve seat 110 with a larger force. The solenoid valve 101 may be opened at even higher fluid pressure differences between inlet 105 and outlet 106. The maximum operating pressure difference of the solenoid valve 101 is increased.

The annular ledge 133 is part of a protrusion 134 positioned at the end of the aperture 129 towards the valve seat 110 in the open position of the solenoid valve 101. The protrusion 134 extends from an inner circumference of the aperture 129. The annular ledge 133 provides a stop for the valve element 109.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A solenoid valve comprising:
   a housing having an inlet and an outlet;
   a valve element; and
   a valve seat;
   at least one one-piece progressive spring guided in a cylindrical bore;

wherein the valve element is forced by the at least one progressive spring in a closing direction;

wherein the progressive spring comprises at least two spring sections;

wherein the at least two spring sections have a different pitch and the spring section with the lower pitch is fully compressed in an open position of the solenoid valve;

wherein the solenoid valve is in a closed position where the valve element sealingly engages the valve seat when the solenoid valve is not provided with an electrical current.

2. The solenoid valve according to claim 1, wherein the solenoid valve comprises a substantially cylindrical valve member received slideably within the solenoid valve.

3. The solenoid valve according to claim 2, wherein the progressive spring is guided in a cylindrical bore, wherein the cylindrical bore is in the valve member.

4. The solenoid valve according to claim 1, wherein the solenoid valve further comprises an aperture, wherein the valve element is slidably received in the aperture.

5. The solenoid valve according to claim 4, wherein a protrusion extends from a radially inner circumference of the aperture, wherein the protrusion comprises an annular ledge at the end of the aperture facing the valve seat, and wherein the annular ledge provides a stop for the valve element.

6. The solenoid valve according to claim 4, wherein upon providing electrical current to the solenoid valve a valve member is first displaced in a direction away from the valve seat by a stroke height.

7. The solenoid valve according to claim 6, wherein after having been displaced by the stroke height the valve member engages the valve element and lifts the valve element from the valve seat.

8. The solenoid valve according to claim 1, wherein the solenoid valve comprises an anchor core against which the progressive spring is abutting.

9. The solenoid valve according to claim 2, wherein an additional end bore is at the end of the valve member facing away from the valve seat, wherein the additional end bore has a larger cross-sectional area than the cylindrical bore.

10. The solenoid valve according to claim 9, wherein the solenoid valve comprises an anchor core which comprises an anchor protrusion that the valve member may rest against at the additional end bore when the valve element is displaced away from the valve seat.

11. The solenoid valve according to claim 1, wherein the valve seat is next to an orifice having an orifice inlet and an orifice outlet, wherein the orifice has a diffuser characteristic in a direction from the orifice inlet towards the orifice outlet.

12. A vapor compression system, comprising the solenoid valve according to claim 1.

13. The solenoid valve according to claim 2, wherein the solenoid valve further comprises an aperture, wherein the valve element is slidably received in the aperture.

14. The solenoid valve according to claim 5, wherein upon providing electrical current to the solenoid valve the valve member is first displaced in a direction away from the valve seat by a stroke height.

15. The solenoid valve according to claim 2, wherein the solenoid valve comprises an anchor core against which the progressive spring is abutting.

16. The solenoid valve according to claim 3, wherein the solenoid valve comprises an anchor core against which the progressive spring is abutting.

17. The solenoid valve according to claim 11, wherein the orifice is an integral part of a membrane.

18. The solenoid valve according to claim 11, wherein the orifice is in an orifice member connected to a membrane.

19. The solenoid valve according to claim 18, wherein the orifice member is configured to move from a first position, when the solenoid valve is in the closed position, to a second position when the solenoid valve is in the open position.

20. The solenoid valve according to claim 19, wherein the membrane is configured to move with the orifice member when the orifice member moves from the first position to the second position.

* * * * *